(12) United States Patent
Asano et al.

(10) Patent No.: US 9,180,554 B2
(45) Date of Patent: Nov. 10, 2015

(54) ALUMINUM ALLOY MEMBER

(71) Applicant: UACJ Corporation, Chiyoda-ku, Tokyo (JP)

(72) Inventors: Mineo Asano, Chiyoda-ku (JP); Yusuke Yamamoto, Chiyoda-ku (JP); Toshihiko Fukuda, Chiyoda-ku (JP)

(73) Assignee: UACJ CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 14/359,712

(22) PCT Filed: Aug. 6, 2013

(86) PCT No.: PCT/JP2013/071211
§ 371 (c)(1),
(2) Date: May 21, 2014

(87) PCT Pub. No.: WO2014/054338
PCT Pub. Date: Apr. 10, 2014

(65) Prior Publication Data
US 2014/0348698 A1 Nov. 27, 2014

(30) Foreign Application Priority Data

Oct. 4, 2012 (JP) ................................. 2012-221884

(51) Int. Cl.
*B23K 35/28* (2006.01)
*C22F 1/05* (2006.01)
*C22C 21/08* (2006.01)
*B23K 20/12* (2006.01)

(52) U.S. Cl.
CPC .............. *B23K 35/288* (2013.01); *B23K 20/122* (2013.01); *B23K 20/128* (2013.01); *C22C 21/08* (2013.01); *C22F 1/05* (2013.01); *B23K 2201/006* (2013.01); *B23K 2201/34* (2013.01); *B23K 2203/10* (2013.01)

(58) Field of Classification Search
CPC .......... C22C 1/05; C22C 1/08; B23K 20/122; B23K 35/288
USPC .......................................... 420/532
See application file for complete search history.

(56) References Cited

U.S. PATENT DOCUMENTS 4,659,396 A * 4/1987 Lifka et al. .................... 148/690

FOREIGN PATENT DOCUMENTS

| GB | 1267235 A | * | 3/1972 |
|---|---|---|---|
| JP | 08-283991 A | | 10/1996 |
| JP | 2000-135563 A | | 5/2000 |
| JP | 2003-225780 A | | 8/2003 |
| JP | 2003-230970 A | | 8/2003 |
| JP | 2007-289984 A | | 11/2007 |
| WO | WO 2012/046352 A1 | | 4/2012 |

OTHER PUBLICATIONS

International Search Report of PCT/JP2013/071211 (2 pages).

* cited by examiner

*Primary Examiner* — Jessee Roe
*Assistant Examiner* — Christopher Kessler
(74) *Attorney, Agent, or Firm* — Flynn, Thiel, Boutell & Tanis, P.C.

(57) ABSTRACT

An aluminum alloy member including a sheet-like aluminum alloy member having ends joined by friction stir welding, and forming an anodic oxidation coating on a weld front surface or a weld back surface, the aluminum alloy member including 0.3 to 1.5 mass % of Mg, 0.2 to 1.2 mass % of Si, 0.5 mass % or less of Cu, and 0.2 mass % or less of Fe, with the balance being Al and unavoidable impurities, Fe-containing second phase particles having a particle size (circle equivalent diameter) of more than 1 μm, among second phase particles dispersed in a matrix of the aluminum alloy member, having an average particle size of 5 μm or less.

2 Claims, No Drawings

ALUMINUM ALLOY MEMBER

BACKGROUND

The invention relates to an aluminum alloy member that is used for joining the ends of a sheet-like aluminum alloy member by friction stir welding, and forming an anodic oxidation coating on the weld front surface or the weld back surface. More specifically, the invention relates to an aluminum alloy member that is used to produce a vehicular wheel or a housing.

A vehicular wheel and a housing are generally formed using an aluminum alloy member due to its light weight. For example, a vehicular wheel is produced by bending a sheet-like aluminum alloy member in the shape of a cylinder, integrally joining the ends of the sheet-like aluminum alloy member by friction stir welding, and forming each end of the resulting product by flaring. The surface opposite to the weld surface is used as a design surface, and an anodic oxidation coating is formed on the design surface in order to improve the corrosion resistance and the abrasion resistance of the design surface.

A housing is produced by integrally joining a side material and a covering material formed of an aluminum alloy member by friction stir welding, and smoothly facing the weld surface (including the weld) of the integrally joined side material and covering material. The weld surface is provided with an anodic oxidation coating in order to improve the corrosion resistance and the abrasion resistance of the weld surface, and is used as a design surface.

When producing a vehicular wheel or a housing as described above, the anodic oxidation coating formed on the design surface may show a difference in color tone between an area corresponding to the weld obtained by friction stir welding (i.e., an area including the weld and its peripheral area) and the remaining area (matrix (base material)) due to the difference in crystal grain size. In order to solve this problem, a technique that equalizes the crystal grain size by heat treatment has been proposed. However, even when the crystal grain size is equalized by heat treatment, the difference in color tone of the anodic oxidation coating may not be sufficiently reduced.

JP-A-2003-225780 and JP-A-2003-230970 disclose related-art technology.

SUMMARY OF THE INVENTION

In order to prevent a difference in color tone of an anodic oxidation coating formed on an aluminum alloy member, the inventors of the present invention compared the cross-sectional microstructure in the weld of the aluminum alloy member obtained by friction stir welding and the cross-sectional microstructure in the remaining area in detail. As a result, the inventors found that coarse Al—Fe-based second phase particles and Al—Fe—Si-based second phase particles are finely ground in the weld due to stirring using the rotating pin, and the amount (number) of second phase particles having a particle size (circle equivalent diameter (hereinafter the same)) of more than 1 μm is reduced. Moreover, second phase particles having a particle size of 5 μm or more were rarely observed.

However, when observing the design surface that was smoothly faced or formed, second phase particles including coarse second phase particles were unevenly dispersed in an area including the weld and an area around the weld (hereinafter referred to as "weld equivalent area") as compared with the remaining area. It is considered that second phase particles unevenly dispersed in the weld equivalent area increase a change in etch pit formation, and are observed as a difference in color tone of the anodic oxidation coating. Therefore, it was found that it is necessary to appropriately control the dispersion of second phase particles in the aluminum alloy member in order to prevent a difference in color tone.

The invention was achieved based on the above finding. An object of the invention is to provide an aluminum alloy member that is used for joining the ends of a sheet-like aluminum alloy member by friction stir welding, and forming an anodic oxidation coating on the weld front surface or the weld back surface, and prevents a difference in color tone of the anodic oxidation coating due to uneven dispersion of second phase particles in the weld equivalent area.

According to one aspect of the invention, an aluminum alloy member is used for joining ends of a sheet-like aluminum alloy member by friction stir welding, and forming an anodic oxidation coating on a weld front surface or a weld back surface, the aluminum alloy member including 0.3 to 1.5 mass % of Mg, 0.2 to 1.2 mass % of Si, 0.5 mass % or less of Cu, and 0.2 mass % or less of Fe, with the balance being Al and unavoidable impurities, Fe-containing second phase particles having a particle size of more than 1 μm, among second phase particles dispersed in a matrix of the aluminum alloy member, having an average particle size of 5 μm or less. Note that the unit "mass %" may be hereinafter referred to as "%". The term "weld front surface" used herein refers to a weld surface into which a rotating pin is inserted during friction stir welding, and the term "weld back surface" used herein refers to a surface opposite to the weld front surface.

In the aluminum alloy member according to one aspect of the invention, the Fe-containing second phase particles having a particle size of more than 1 μm may be dispersed in the matrix at a dispersion density of 10,000 particles/mm$^2$ or less.

When joining the aluminum alloy member according to one aspect of the invention by friction stir welding, and forming an anodic oxidation coating on the weld surface or the surface opposite to the weld surface, uneven dispersion of Fe-containing second phase particles is suppressed. Therefore, a change in etch pit formation decreases in the weld equivalent area and the remaining area, and a difference in color tone of the anodic oxidation coating due to the uneven dispersion of Fe-containing second phase particles is prevented (i.e., a uniform anodic oxidation coating can be formed). This makes it possible to improve the quality of a product (e.g., vehicular wheel or housing) produced using an aluminum alloy member.

DESCRIPTION OF EXEMPLARY EMBODIMENTS

The significance of each alloy component included in the aluminum alloy member according to one aspect of the invention, and the reasons for the limitation to the content of each alloy component are described below. Mg contributes to an adjustment of the strength of a vehicular wheel or a housing through precipitation hardening due to precipitation of Mg—Si-based compounds. The Mg content is preferably 0.3 to 1.5%. If the Mg content is less than 0.3%, the aluminum alloy member may not exhibit sufficient strength. If the Mg content exceeds 1.5%, the strength of the aluminum alloy member may increase to a large extent, and it may be difficult to form the aluminum alloy member. The Mg content is more preferably 0.4 to 1.2%, and still more preferably 0.5 to 1.2%, taking account of the balance between strength and ease of forming.

Si contributes to an adjustment of the strength of a vehicular wheel or a housing through precipitation hardening due to the precipitation of Mg—Si-based compounds. The Si content is preferably 0.2 to 1.2%. If the Si content is less than 0.2%, the aluminum alloy member may not exhibit a sufficient strength. If the Si content exceeds 1.2%, the strength of the aluminum alloy member may increase to a large extent, and it may be difficult to form the aluminum alloy member. The Si content is more preferably 0.3 to 1.0%, and still more preferably 0.4 to 0.9%, taking account of the balance between strength and ease of forming.

Cu ensures that the entire anodic oxidation coating has a uniform color tone. The Cu content is preferably 0.5% or less. If the Cu content exceeds 0.5%, the anodic oxidation coating may become opaque due to the effects of fine Al—Mg—Si—Cu-based precipitates. The Cu content is more preferably 0.4% or less.

Fe forms Al—Fe-based second phase particles and Al—Fe—Si-based second phase particles. If the Fe content exceeds 0.2%, Al—Fe-based second phase particles and Al—Fe—Si-based second phase particles having an average particle size of more than 5 μm may be easily formed. Coarse Fe-containing second phase particles are preferentially ground in the weld due to stirring during friction stir welding. On the other hand, Fe-containing second phase particles including coarse Fe-containing second phase particles are unevenly dispersed in the weld equivalent area (including an area around the weld) due to stirring during friction stir welding. As a result, the anodic oxidation coating may show a difference in color tone. Therefore, the Fe content is preferably set to 0.2% or less. The Fe content is more preferably 0.15% or less.

In the aluminum alloy member according to one aspect of the invention, it is preferable that Fe-containing second phase particles having a particle size of more than 1 μm be dispersed in the matrix at a dispersion density of 10,000 particles/mm$^2$ or less.

Dispersion of Fe-containing second phase particles in the weld equivalent area can be minimized by reducing the amount (number) of Fe-containing second phase particles having a particle size of more than 1 μm that are dispersed in the aluminum alloy member. This makes it possible to reduce a change in etch pit formation, and reliably suppress a difference in color tone of the anodic oxidation coating. Since Fe-containing second phase particles having a particle size of 1 μm or less do not cause a difference in color tone of the anodic oxidation coating, Fe-containing second phase particles having a particle size of 1 μm or less may be dispersed in the matrix.

If the dispersion density of Fe-containing second phase particles having a particle size of more than 1 μm exceeds 10,000 particles/mm$^2$, Fe-containing second phase particles may be unevenly dispersed in the weld equivalent area as compared with the remaining area, and a change in etch pit formation may increase, whereby the anodic oxidation coating may show a difference in color tone. In order to prevent an uneven dispersion of Fe-containing second phase particles in the weld equivalent area, the dispersion density of Fe-containing second phase particles having a particle size of more than 1 μm is set to 10,000 particles/mm$^2$ or less to reduce the amount (number) of Fe-containing second phase particles.

The embodiments of the invention are characterized in that the content of Fe that forms Fe-containing second phase particles is specified, and the particle size and the dispersion density of Fe-containing second phase particles are controlled. The particle size and the dispersion density of Fe-containing second phase particles are preferably controlled by setting the cooling rate during casting to 0.1° C./sec or more (preferably 1° C./sec or more), setting the homogenization temperature to 450° C. or more (preferably 500° C. to the melting point), setting the homogenization time to 1 hour or more (preferably 5 hours or more), and setting the hot working ratio to 90% or more (extrusion ratio: 10 or more) (preferably 95% or more (extrusion ratio: 20 or more)). The working ratio is calculated by "{(cross-sectional area before working−cross-sectional area after working)/(cross-sectional area before working)}×100". The rolling ratio is calculated by "{(thickness before rolling−thickness after rolling)/(thickness before rolling)}×100". The extrusion ratio is calculated by "cross-sectional area before extrusion/cross-sectional area after extrusion".

EXAMPLES

The invention is further described below by way of examples and comparative examples to demonstrate the advantageous effects of the invention. Note that the following examples are for illustration purposes only, and the invention is not limited to the following examples.

Example 1 and Comparative Example 1

An aluminum alloy (A to C) having the composition shown in Table 1 was cast by semi-continuous casting to obtain a billet having a diameter of 200 mm. The cooling rate during casting was set to about 1 to 3° C./sec, and differed between the center area and the surface area of the billet. The resulting billet having a diameter of 200 mm was homogenized at 550° C. for 12 hours, and hot-extruded to form a flat bar having a thickness of 10 mm and a width of 100 mm (working ratio: 96.8%, extrusion ratio: 31.4), which was subjected to natural aging to obtain a T4 temper material. The material was machined to prepare two sheets having a thickness of 3 mm, a width of 90 mm, and a length of 150 mm. The sheets were fitted along the longitudinal direction, and welded by friction stir welding. The rotational speed of the tool was set to 500 rpm, and the welding speed was set to 800 mm/min. The diameter of the tool was 7 mm, and the diameter of the rotating pin was 3 mm. Note that Alloy C was a 6063 material of which the Fe content was slightly higher than the upper limit specified by the invention.

TABLE 1

| Alloy | Si | Fe | Cu | Mn | Mg | Cr | Zn | Ti | Al |
|---|---|---|---|---|---|---|---|---|---|
| A | 0.41 | 0.03 | 0.08 | 0.01 | 0.91 | 0.01 | 0.01 | 0.01 | Bal. |
| B | 0.52 | 0.20 | 0.36 | 0.01 | 1.05 | 0.02 | 0.01 | 0.02 | Bal. |
| C | 0.45 | 0.22 | 0.03 | 0.01 | 0.73 | 0.02 | 0.01 | 0.01 | Bal. |

Note:
The unit for the content of each component is "mass %".

The weld surface (including the weld) of the resulting welded material was faced using a milling machine to remove the surface layer by 0.5 mm. The material was then surface-roughened by shot blasting to obtain a sample. The weld front surface of the sample was anodized using sulfuric acid to form an anodic oxidation coating having a thickness of 10 μm.

Sample 1 (Alloy A) and Sample 2 (Alloy B) that fall within the scope of the invention did not show a difference in color tone between the weld equivalent area and the remaining area after forming the anodic oxidation coating to demonstrate the advantageous effects of the invention. On the other hand, Sample 3 (Alloy C) showed a difference in color tone between the weld equivalent area and the remaining area.

The surface microstructure in the weld equivalent area and the surface microstructure in the remaining area after facing by 0.5 mm were observed for Sample 1 (Alloy A), Sample 2 (Alloy B), and Sample 3 (Alloy C). Specifically, each sample was buffed, etched using 5% hydrofluoric acid, observed using an optical microscope at a magnification of 400, and subjected to image analysis to measure the dispersion density (particles/mm$^2$) of particles having a particle size of more than 1 μm at intervals of 1 μm.

It was confirmed by the measurement results that Fe-containing second phase particles were uniformly dispersed in the weld equivalent area and the remaining area in Sample 1 (Alloy A) and Sample 2 (Alloy B) that fall within the scope of the invention. In Sample 1 (Alloy A), the maximum average particle size of Fe-containing second phase particles was 2 μm, and the dispersion density of Fe-containing second phase particles having a particle size of more than 1 μm was 3260 particles/mm$^2$. In Sample 2 (Alloy B), the maximum average particle size of Fe-containing second phase particles was 4 μm, and the dispersion density of Fe-containing second phase particles having a particle size of more than 1 μm was 5780 particles/mm$^2$.

In contrast, Fe-containing second phase particles were unevenly dispersed in the weld equivalent area in Sample 3 (Alloy C) as compared with the remaining area. In Sample 3 (Alloy C), the maximum average particle size of Fe-containing second phase particles was 7 μm, and the dispersion density of Fe-containing second phase particles having a particle size of more than 1 μm was 8360 particles/mm$^2$.

Example 2 and Comparative Example 2

An aluminum alloy (D and E) having the composition shown in Table 2 was cast by semi-continuous casting, and a T4 temper material was prepared in the same manner as in Example 1. The material was machined to prepare two sheets having a thickness of 3 mm, a width of 90 mm, and a length of 150 mm. The sheets were fitted along the longitudinal direction, and welded by friction stir welding.

TABLE 2

| Alloy | Si | Fe | Cu | Mn | Mg | Cr | Zn | Ti | Al |
|---|---|---|---|---|---|---|---|---|---|
| D | 0.72 | 0.05 | 0.35 | 0.01 | 1.12 | 0.01 | 0.02 | 0.01 | Bal. |
| E | 0.53 | 0.22 | 0.05 | 0.01 | 0.77 | 0.02 | 0.01 | 0.02 | Bal. |

Note:
The unit for the content of each component is "mass %".

The weld surface (including the weld) of the resulting welded material was faced using a milling machine to remove the surface layer by 0.5 mm. The material was then surface-roughened by shot blasting to obtain a sample. The weld front surface of the sample was anodized using sulfuric acid to form an anodic oxidation coating having a thickness of 10 μm.

Sample 4 (Alloy D) that falls within the scope of the invention did not show a difference in color tone between the weld equivalent area and the remaining area after forming the anodic oxidation coating, and did not show a streak pattern. In Sample 4 (Alloy D), the maximum average particle size of Fe-containing second phase particles was 3 μm, and the dispersion density of Fe-containing second phase particles having a particle size of more than 1 μm was 4190 particles/mm$^2$.

In contrast, Sample 5 (Alloy E) showed a difference in color tone between the weld equivalent area and the remaining area after forming the anodic oxidation coating. Fe-containing second phase particles were unevenly dispersed in the weld equivalent area in Sample 5 (Alloy E) as compared with the remaining area. In Sample 5 (Alloy E), the maximum average particle size of Fe-containing second phase particles was 8 μm, and the dispersion density of Fe-containing second phase particles having a particle size of more than 1 μm was 14,320 particles/mm$^2$.

Although only some exemplary embodiments and/or examples of the invention have been described in detail above, those skilled in the art will readily appreciate that many modifications are possible in the exemplary embodiments and/or examples without materially departing from the novel teachings and advantages of the invention. Accordingly, all such modifications are intended to be included within the scope of the invention.

What is claimed is:

1. An aluminum alloy member comprising an aluminum alloy sheet having ends joined by friction stir welding, a weld front surface or a weld back surface being anodically oxidized, the aluminum alloy member further comprising 0.3-1.5 mass % of Mg, 0.2-1.2 mass % of Si, no more than 0.5 mass % of Cu, no more than 0.2 mass % of Fe, with the balance being Al and unavoidable impurities and Fe-containing second phase particles having a particle size of more than 1 μm among second phase particles disposed in a matrix of the aluminum alloy member having an average particle size of no more than 5 μm, wherein the weld front surface is a weld surface into which a rotating pin is inserted during friction stir welding and the weld back surface is a surface opposite to the weld front surface.

2. The aluminum alloy member according to claim 1, wherein the Fe-containing second phase particles having a particle size of more than 1 μm are dispersed in the matrix at a dispersion density of 10,000 particles/mm$^2$ or less.

* * * * *